United States Patent
Navar (10) Patent No.: US 7,081,076 B2
(45) Date of Patent: Jul. 25, 2006

(54) DEVICE FOR AUTOMATICALLY MOUNTING AND DISMANTLING TOOLS ON A ROBOT

(75) Inventor: Pierre Navar, Ecuisses (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 11/009,007

(22) Filed: Dec. 13, 2004

(65) Prior Publication Data

US 2005/0119096 A1 Jun. 2, 2005

(51) Int. Cl.
*B23Q 3/155* (2006.01)
(52) U.S. Cl. .......................... 483/16; 483/54; 483/901
(58) Field of Classification Search .................. 483/16, 483/54, 901, 1, 7, 10, 13, 17, 18, 19, 30, 483/33, 49, 51, 53, 55, 57, 59, 60, 63, 64, 483/8, 9, 11; 221/11, 82, 83, 194; 414/800, 414/801, 798, 797.8
See application file for complete search history.

(56) References Cited

U.S. PATENT DOCUMENTS

| | | | | |
|---|---|---|---|---|
| 4,584,759 A | * | 4/1986 | Bleich | 483/10 |
| 5,088,604 A | * | 2/1992 | Baur et al. | 211/1.55 |
| 5,242,359 A | * | 9/1993 | Obrist | 483/1 |
| 5,277,688 A | | 1/1994 | Whittington et al. | |
| 5,304,110 A | * | 4/1994 | Obrist | 483/14 |
| 5,318,496 A | * | 6/1994 | Takahashi | 483/1 |
| 5,692,878 A | * | 12/1997 | Freund | 414/796.6 |
| 5,904,467 A | * | 5/1999 | Kang | 414/798 |
| 5,941,681 A | * | 8/1999 | Piotrowski et al. | 414/797.8 |
| 5,993,365 A | * | 11/1999 | Stagnitto et al. | 483/59 |
| 6,196,787 B1 | * | 3/2001 | Manuszak et al. | 414/801 |
| 6,332,861 B1 | * | 12/2001 | Otsuka et al. | 483/55 |
| 6,520,895 B1 | * | 2/2003 | Senga et al. | 483/1 |
| 6,569,070 B1 | * | 5/2003 | Harrington et al. | 483/1 |

FOREIGN PATENT DOCUMENTS

FR 2 823 142 10/2002

* cited by examiner

Primary Examiner—Boyer D. Ashley
Assistant Examiner—Dana Ross
(74) Attorney, Agent, or Firm—Oblon, Spivak, McClelland, Maier & Neustadt, P.C.

(57) ABSTRACT

Device for automatically mounting and dismantling tools (10) on a robot (16), comprising means (1) for storing a number of identical fresh tools (10) and means (11) for centering one of these tools (10) in a position for automatic mounting on the robot (16), each tool (10) comprising an axial orifice for mounting on a rotating pin (15) provided on the robot (16).

15 Claims, 8 Drawing Sheets

DEVICE FOR AUTOMATICALLY MOUNTING AND DISMANTLING TOOLS ON A ROBOT

BACKGROUND OF THE INVENTION

The present invention relates to a device for automatically mounting and dismantling tools on a robot with a robotic arm.

The tools mounted on a robotic arm must regularly be replaced to change the type of tool used, its characteristics or simply to replace a worn tool with a fresh one.

The types of tool concerned by the invention comprise an axial orifice for mounting on a pin for rotating the tool, in particular brushes and grinding wheels.

DESCRIPTION OF THE PRIOR ART

In the current state of the art, the various types of tools are stored on slides terminating at their lower end in a V-shaped part for centering a tool in a position for automatic mounting on a robotic arm. The lower end of the slide bears sensors to determine the position of the tool mounting orifice.

For each type of tool, there is also a station for depositing and retrieving partially worn tools, this station also having sensors providing information on whether or not there is a partially worn tool present and its position.

This known method has a number of disadvantages:
- the slides, inclined at 45°, are relatively long so as to be able to each support ten or so tools, and together with the corresponding deposit stations take up a relatively large volume of space around the robot;
- five or six sensors are used for each type of tool, which in total amounts to fifty to sixty sensors for ten types. Since each sensor is linked to an input of the robot, the robot has to have an input/output extension board, which is quite expensive (typically two thousand euro);
- when the tools are brushes, they can become deformed to a greater or lesser degree owing to their flexibility, and their bearing on the V-shaped part at the end of the slide is not always enough to position them precisely to enable them to be automatically mounted on a robotic arm. In this case, the automatic mounting operation fails and an operator has to intervene.

It has also been observed, by studying the robot's operating time, that the time spent waiting for a change of tool is equal to or greater than the time in use, which is around six minutes for an abrasive brush, the operator having to launch a machining program on the robot, then come back and perform manual operations at his workstation.

One of the aims of the present invention is to overcome these disadvantages.

SUMMARY OF THE INVENTION

To this end, the invention proposes a device for automatically mounting and dismantling tools on a robot, comprising means for storing a number of identical tools and means for centering a tool in a position for automatic mounting on the robot, each tool comprising an axial orifice for mounting on a rotating pin provided on the robot, wherein the storage means comprise a surface for supporting a stack of tools and means for centering the stack of tools, consisting of an axially movable cylindrical rod engaged in the axial orifices of the tools of the stack, said support surface comprising an orifice through which said pin passes, located on the axis of the stack of tools and connected by a slot to an edge of the support surface, such that the pin can be engaged in the orifice of the support surface and in the axial orifice of the lowermost tool of the stack by pushing back the cylindrical centering rod, and then moved transversely in said slot to remove this tool from the storage means.

In the device according to the invention, the stacked tools are centered precisely on the support surface using the rod engaged in their axial orifices, irrespective of any deformations of these tools owing to their flexibility (in the case of brushes). Such precise centering eliminates the risk of failure of the automatic mounting on the robot. Moreover, the storage of the tools in vertical stacks means the device takes up much less space around the robot.

According to a characteristic of the invention, the support surface for the tools is mounted so as to slide in the tool stacking direction and is associated with a sensor for detecting its movement and with a second support surface for tools, located under the first and having substantially the same configuration as it. The mobility of the first support surface makes it possible firstly to check for the presence of a tool on the pin, secondly to check for the presence of tools in the storage means and lastly to create a space for housing a partially worn tool between the first and second support surfaces, the sensor also making it possible to check for the presence of a partially worn tool in this housing space.

In the device according to the invention, a single sensor for detecting the movements of the first support surface suffices to inform the robot as to whether or not a tool has been correctly mounted on the rotating pin, whether or not there are fresh tools in the storage means, and whether or not there is a partially worn tool between the two support surfaces.

When ten or so devices according to the invention are arranged around the robot, the ten corresponding sensors can be linked to the robot without the need for the latter to have an input/output extension board. This results in a significant cost saving.

The invention also proposes a method of automatically mounting and dismantling tools on a robot, such as a robotic arm, by implementing the device according to the invention, which method consists in:
- bringing the pin of the robot into a predetermined position under the axis of the stack of tools;
- moving the pin along the axis to engage it in the axial orifice of the lowermost tool of the stack, by pushing back the centering rod; and
- moving the pin in the direction away from the stack of tools to disengage the tool from the storage means.

The method according to the invention also makes it possible to dismantle a partially worn tool and retrieve the partially worn tool, and thus consists in:
- bringing this tool under the first support surface; and
- pushing the first support surface for tools using the tool mounted on the pin to move it away from the second support surface for tools; and
- moving the pin in a direction parallel to the support surfaces, to bring the tool between these support surfaces; and
- axially moving the pin, in the direction away from the stack of tools, to remove the partially worn tool and leave this tool between the two support surfaces.

Moreover, only a small number of positions of the pin in space, predetermined and stored in memory, are needed to program the movements of the robotic arm in order to automatically mount and dismantle fresh tools and partially worn tools.

BRIEF DESCRIPTION OF THE DRAWINGS

Other advantages and features of the invention will become clear on reading the following description, given by way of non-limiting example, with reference to the appended drawings, in which.

DESCRIPTION OF THE PREFERRED EMBODIMENTS

Figure 1:
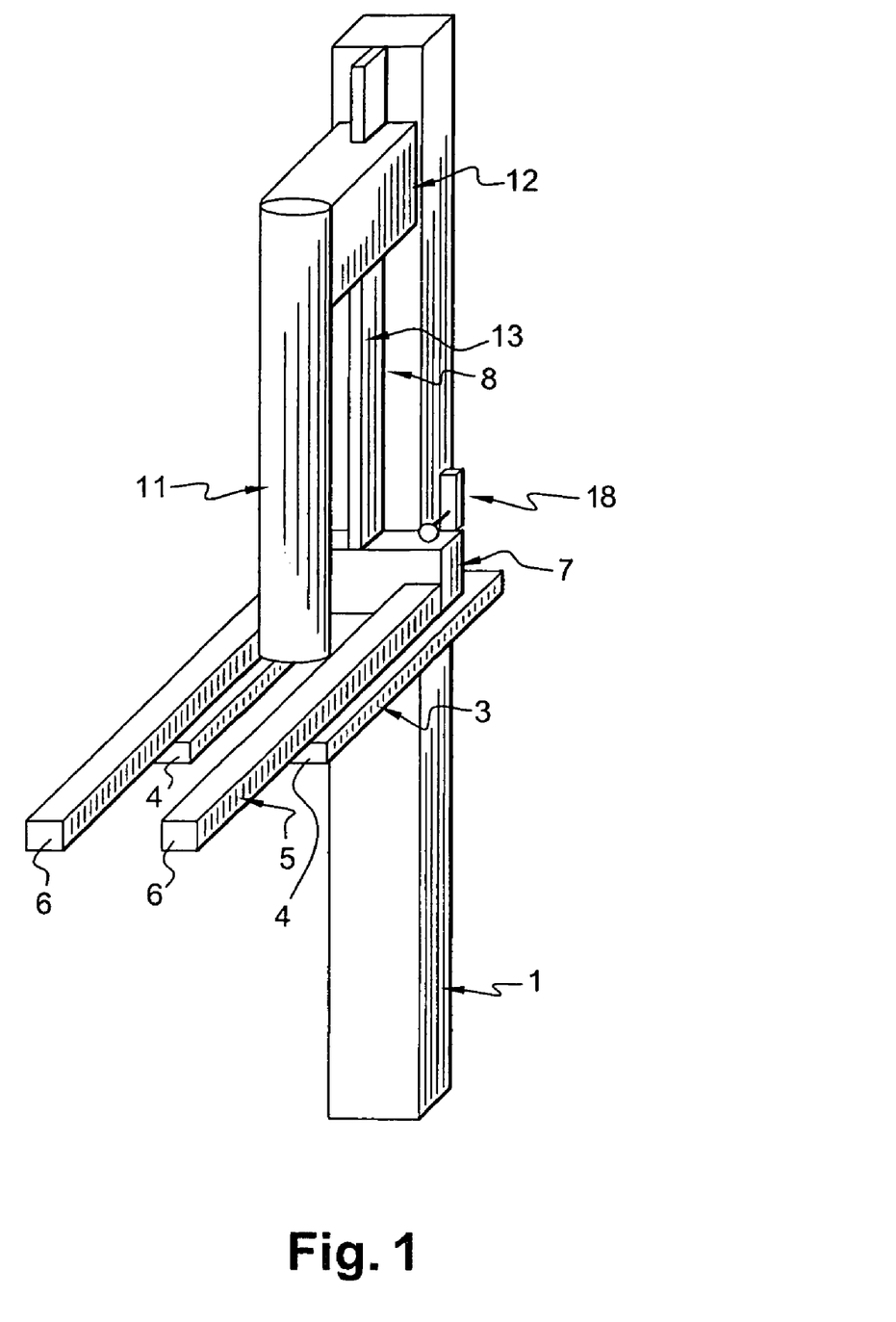
FIG. 1 is a schematic perspective view of the device according to the invention.

Referring first to FIG. 1, this schematically shows an embodiment of the device according to the invention.

This device is essentially intended for the storage of fresh tools such as brushes or grinding wheels, and is designed to allow the automatic mounting and dismantling of these tools on a robotic arm having a pin for rotating a tool.

It comprises storage means comprising a vertical upright 1, which is fastened to the floor or a wall by appropriate means, on which is fixedly mounted a horizontal support 3 in the shape of a fork, comprising two parallel arms 4 extending in the same direction from the vertical upright 1 and separated from one another by a distance which is smaller than the diameter of the tools intended to be stored in the device according to the invention, and larger than the diameter of the pin of the robotic arm on which these tools must be mounted, as will be seen more clearly below.

Another support 5, also fork-shaped, is mounted so as to slide vertically on the vertical upright 1 above the fixed support 3 and comprises two parallel arms 6 joined together by a transverse bar 7 at their end on the vertical upright 1 side.

The horizontal arms 6 are separated by a distance substantially equal to that separating the arms 4 of the fixed support surface 3 and are longer than the arms 4, such that they project beyond the arms 4 on the side away from the vertical upright 1.

The transverse bar 7 of the first support surface 5 is guided as it slides on a vertical rail 8 which is fastened to or formed on a corresponding face of the vertical upright 1 and which extends upward from the second fixed support surface 3.

Figure 2:
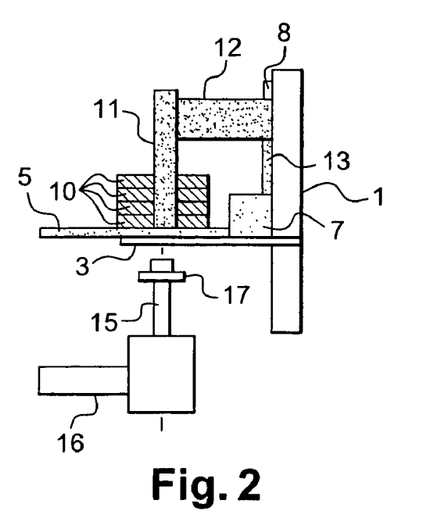
FIGS. 2 to 5 are schematic side views showing the operation of the device according to the invention as a tool is being mounted.

The first support surface 5 is designed to support a stack of tools 10, as shown in FIG. 2 et seq., these tools being identical and stacked vertically one on top of the other, the lowermost tool in the stack resting on the two arms 6 of the support 5, which itself rests on the two arms 4 of the second fixed support surface 3, such that the axial orifices of these tools, which enable them to be mounted on the pin of the robotic arm, are between the two arms 4 of the second fixed support surface 3 and between the two arms 6 of the first support surface 5.

The device according to the invention also comprises means for centering the tools stacked on the first support surface 5, these centering means comprising a vertical cylindrical rod 11 extending above the first support surface 5 and borne at its upper end by a horizontal arm 12 guided in translation on the vertical rail 8 of the upright 1.

A vertical bar 13, forming a spacer or wedge, extends downward from the horizontal arm 12 toward the transverse bar 7 of the first support surface 5, to limit the downward movement of the arm 12 so that the lower end of the cylindrical rod 11, in its lowermost position, is substantially level with the top face of the arms 6 of the first support surface 5.

The diameter of the cylindrical rod 11 is slightly smaller than the diameter of the axial orifice of the tools 10 so that the latter can be stacked while being precisely centered on the axis of the rod 11. The precision of this centering is for example around one to two millimeters.

The device according to the invention makes it possible to store on the first support surface 5 a stack of four tools 10 in the example shown, although this number may be higher and is determined by the length of the centering rod 11 and the corresponding dimension of the vertical upright 1 above the second fixed support surface 3.

The tools 10 stacked on the first support surface 5 are, in this embodiment, fresh tools.

FIGS. 2 to 5 schematically show how a robotic arm takes one of these tools.

In FIG. 2, a robotic arm 16 of a robot having a pin 15 for mounting and rotating a tool 10 is brought under the fixed support 3 such that the pin 15 is oriented vertically upward and aligned with the axis of the rod 11 for centering the tools 10.

The tools 10 form a stack centered precisely on the first support surface 5 by their axial orifices, through which the rod 11 passes, the lower end of which is level with the underside of the lowermost tool 10 of the stack.

Figure 3:
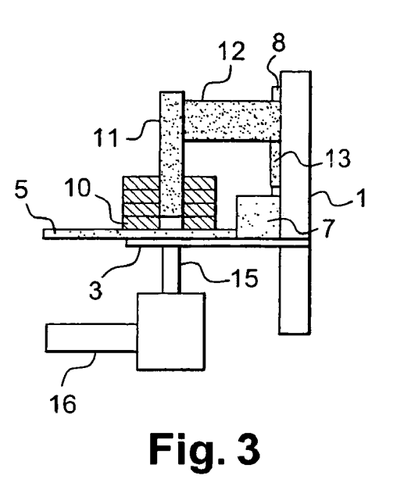

In the next step, shown in FIG. 3, the robotic arm 16 has been moved vertically upward so that the top end of the pin 15 is engaged between the horizontal arms of the supports 3 and 5 and is inside the axial orifice of the lowermost tool 10 of the stack. In this position, the centering rod 11 of the device according to the invention has been pushed back upward by the top end of the pin 15, and the bottom end of the rod 11 is at the interface between the lowermost tool 10 of the stack and the tool immediately above it in the stack.

The pin 15 has an annular lip 17 at a distance from its top end that is equal to the thickness of a tool 10. In the position of FIG. 3, this annular lip 17 presses against the underside of the tool 10 and the end of the pin 15 is at the interface between the two lowermost tools 10 of the stack.

Figures 4, 5:
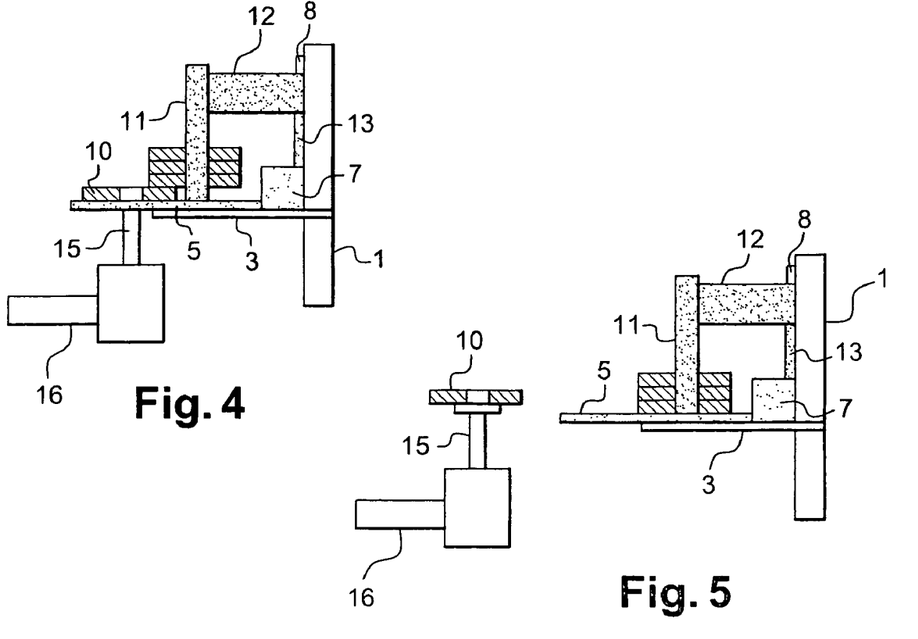

As shown in FIG. 4, the following step consists in moving the robot arm 16 horizontally in a direction parallel to the arms of the supports 3 and 5, to remove from the stack the tool 10 that is mounted on the end of the pin 15. As this tool is removed, the centering rod 11 is released by the tool 10 mounted on the pin 15 and falls back down to the level of the first support surface 5, then, as shown in FIG. 5, the remaining tools 10 in the stack themselves move down onto the first support surface 5, while still being centered by the rod 11.

It is then possible to check for the presence of a tool 10 at the end of the pin 15 in the following manner, described with reference to FIGS. 6 and 7.

Figures 6, 7, 8, 9:
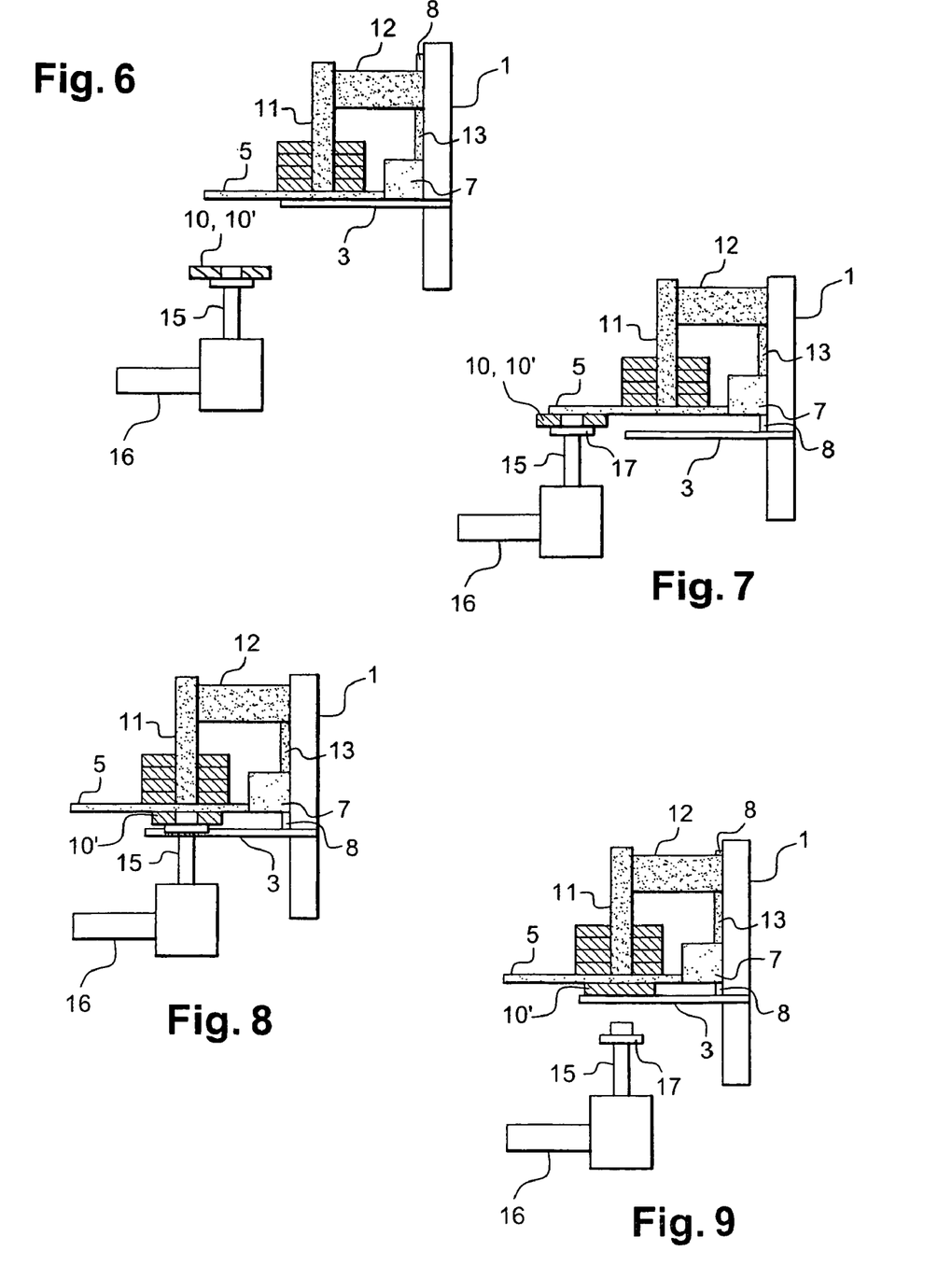
FIGS. 6 to 9 are schematic side views showing the operation of the device according to the invention as a partially worn tool is being dismantled.

In FIG. 6, the robot arm 16 has been moved downward and brought toward the device according to the invention such that the tool 10 mounted on the pin 15 is under the free ends of the arms 6 of the first support surface 5, these free ends projecting beyond the free ends of the arms 4 of the second fixed support surface 3, as already stated.

The robotic arm is then moved upward, as shown in FIG. 7. If a tool 10 is indeed mounted on the end of the pin 15, this tool will bear against the underside of the ends of the arms 6 and move the support 5 upward, away from the fixed support 3. This movement can be detected by means of a sensor 18 mounted for this purpose on the vertical upright 1 and visible in FIG. 1. This confirms firstly the presence of a tool 10 on the pin 15 of the robotic arm and also confirms, a posteriori, that at least one fresh tool was stored in the device according to the invention when the robotic arm 16 executed the maneuvers for taking a tool shown in FIGS. 2 to 5.

If there is no tool 10 on the pin 15 of the robotic arm, the top end of the pin moves between the arms 6 of the support 5, without raising the latter, and the sensor associated with the support 5 detects no upward movement of the latter. This confirms that the device according to the invention had no tool 10 when the robotic arm performed the movements shown in FIGS. 2 to 5, and the device generates a signal to alert the operator.

When a tool mounted on the pin 15 of the robotic arm has to be dismantled when it is only partially worn, it is brought back to the device according to the invention and stored in it in the following manner, described with reference to FIGS. 6 to 9.

The first two steps shown in FIGS. 6 and 7 are those just described, the robotic arm 16 bringing the partially worn tool 10' under the free ends of the arms of the support 5, then being moved upward so that the tool 10' bears on the arms of the support 5 and pushes the latter upward, moving it away from the fixed support 3 by a distance greater than the thickness of the tool 10'.

The next step, shown in FIG. 8, consists in moving the robotic arm 16 horizontally to bring the tool 10' substantially onto the axis of the centering rod 11, but between the supports 3 and 5. The robotic arm 16 is then moved vertically downward to take the top end of the pin 15 out of the central orifice of the tool 10' held between the supports 3 and 5.

It is now possible to put a partially worn tool back in the device according to the invention, without getting it mixed up with the fresh tools which are stacked on the support 5.

This partially worn tool 10' is designed to be retrieved by the robotic arm 16 as a priority over the fresh tools 10 stacked on the support 5.

Figure 10:
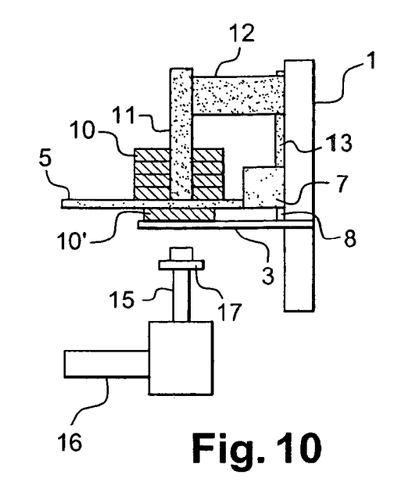
FIGS. 10 to 13 are schematic side views showing the operation of the device according to the invention as a partially worn tool is being mounted.

This is done by following the procedure shown in FIGS. 10 to 13. In FIG. 10, the robotic arm 16 is brought under the fixed support 3 such that the pin 15 is oriented vertically upward and aligned with the rod 11 for centering the tools 10.

Figure 11:
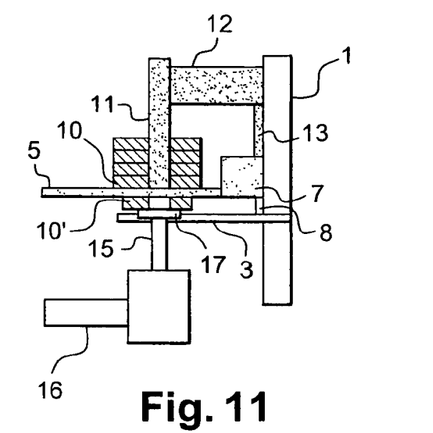

In the next step, shown in FIG. 11, the robotic arm 16 is moved vertically upward so that the top end of the pin 15 is engaged between the horizontal arms of the support 5 and is inside the axial orifice of the partially worn tool 10'. The robotic arm 16 will move the support 5 slightly upward using the tool 10', to facilitate removal of this tool from the storage means.

Figure 12:
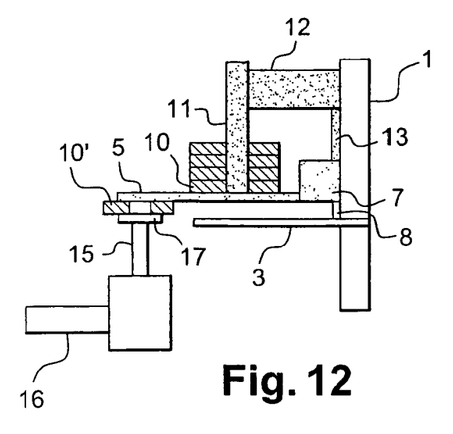
Figure 13:
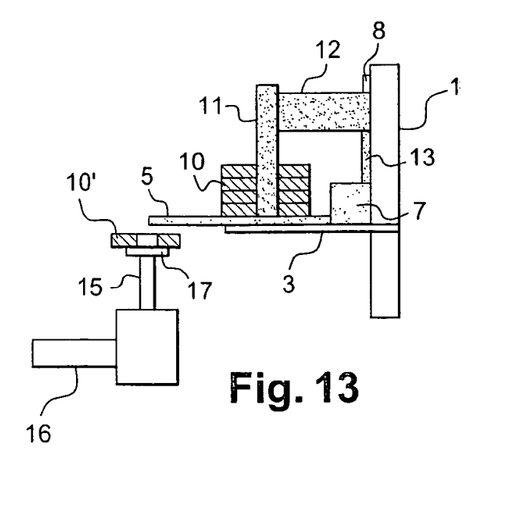

As shown in FIG. 12, the next step consists in moving the robotic arm 16 horizontally in a direction parallel to the arms of the supports 3 and 5 to remove the tool 10' mounted on the end of the pin 15.

It is then possible to check for the presence of the tool 10' at the end of the pin 15 in the same way as described above with reference to FIGS. 6 and 7.

Figure 14:
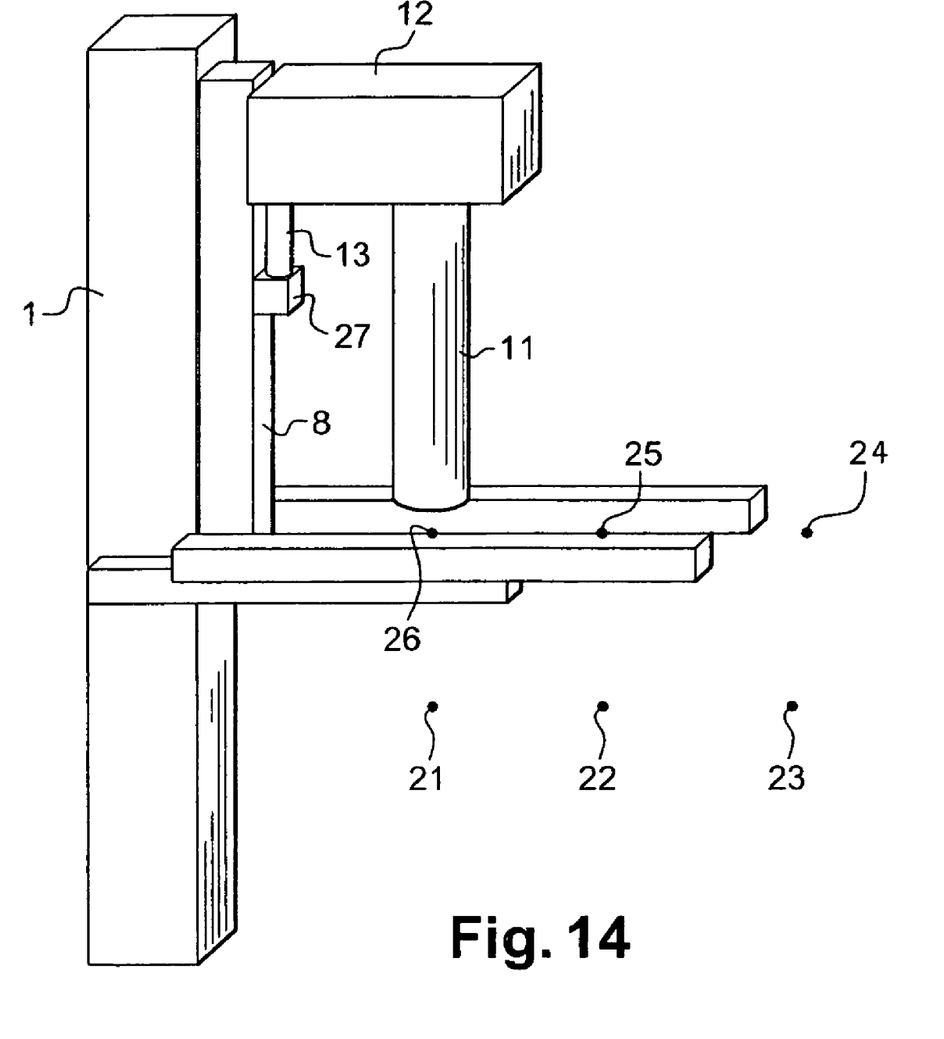
FIG. 14 schematically shows the positions defining the programmed path of the robot's pin in the method according to the invention.

The positions of the pin 15 in space can preferably be determined and stored in memory so as to program the movements of the robotic arm 16 for the automatic mounting and dismantling of tools 10.

Just six positions need be determined and stored, these being shown in FIG. 14, comprising three low positions 21, 22 and 23 and three high positions 24, 25 and 26, distributed over a rectangular path and aligned vertically in pairs. These six positions make it possible to program all the movements of the robotic arm for the execution of the maneuvers described above.

Thus, to mount a fresh tool 10 or partially worn tool 10' on the pin 15, said pin will pass through positions 21, 26 and 24.

To check for the presence of the tool 10 on the pin 15, said pin will pass through positions 22 and 25.

Lastly, to dismantle a partially worn tool 10' mounted on the pin 15, said pin will pass through positions 22, 25, 26 and 21.

Moreover, FIG. 14 shows an embodiment in which the vertical bar 13 that limits the descent of the rod 11 is mounted between the horizontal arm 12 and a stop 27 fastened to the rail 8 or to the upright 1.

Figure 15:
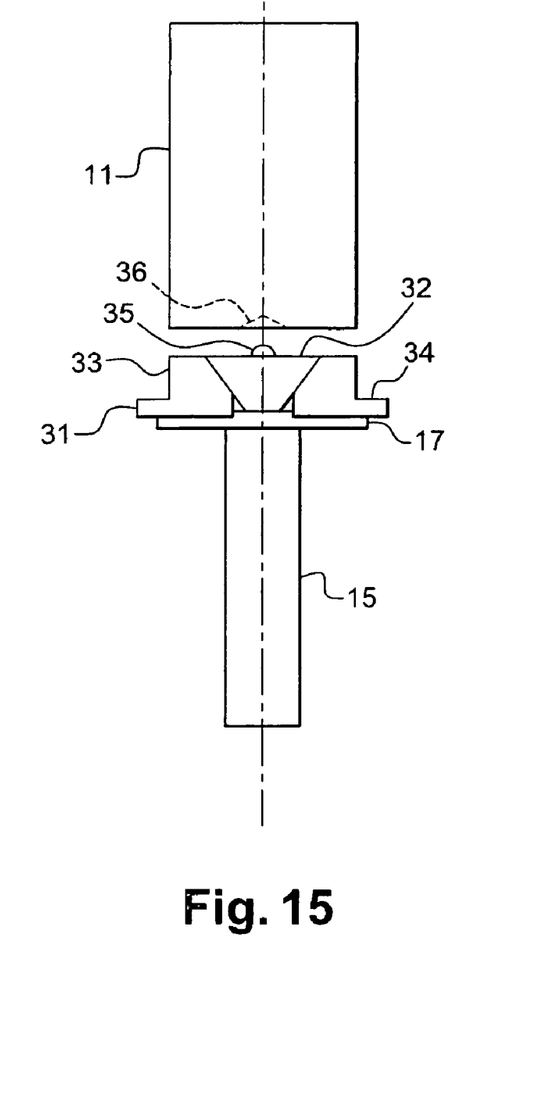
FIGS. 15 and 16 are schematic views illustrating a robot's pin and means for alignment with respect to the centering means of the device according to the invention.
Figure 16:
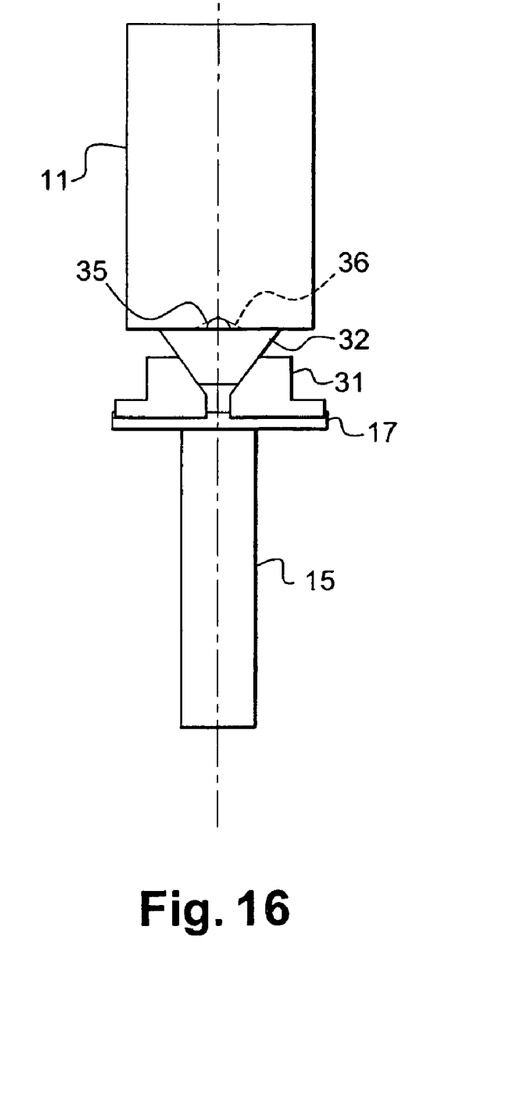

FIGS. 15 and 16 show a type of pin that can be used with the device according to the invention.

At its end the cylindrical pin 15 comprises an annular lip 17 on which are mounted means for fastening the tool 10, comprising at least two jaws 31 arranged radially opposite one another with respect to the axis of the pin 15, and preferably three jaws 31 arranged at 120° around the circumference of the annular lip 17.

The jaws 31 are arranged around an axially movable frustoconical member 32 at the end of the pin 15 that causes the jaws 31 to move apart transversely to allow the tool 10 to be fastened by clamping.

Each jaw has a cylindrical edge 33 for insertion into the axial orifice of a tool and an annular lip 34 via which it abuts against the tool.

The frustoconical member 32 has an axial stud 35 formed on its end face, this stud possibly being rounded as shown in FIGS. 15 and 16. This stud 35 is designed to engage in a small conical axial cavity 36 in the lower end face of the rod 11 to improve the alignment of the pin 15 with the rod 11.

Figure 17:
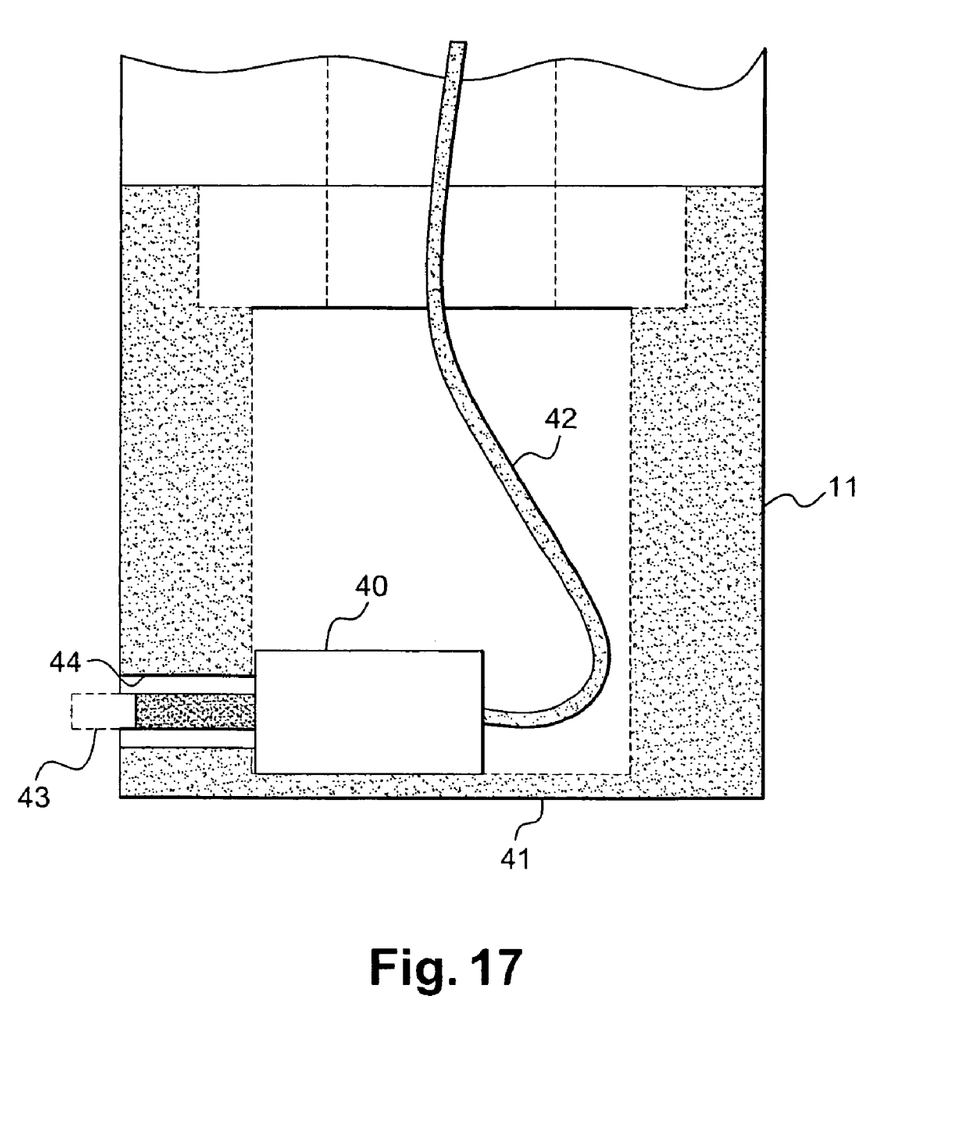
FIG. 17 is an enlarged schematic view in axial section of part of the centering means of the device according to the invention.

FIG. 17 shows means for facilitating the removal of a tool 10 from a stack in the storage means. In this figure, the rod 11 is tubular and comprises at its lower end a micro-ram 40, for example of pneumatic type, mounted on the base 41 of the rod 11 and supplied through a flexible duct 42. A piston rod 43 of the micro-ram extends through a radial orifice 44 of the rod 11 and projects outward from the latter when the micro-ram 40 is supplied. When the pressure on the micro-ram 40 is released, the piston rod 43 retracts inside the centering rod 11. The position of the micro-ram 40 is determined along the axis of the rod 11 so that the piston rod 43 is level with the penultimate tool in the stack when the rod 11 is in the low position. This micro-ram functions as described below.

Figure 18:
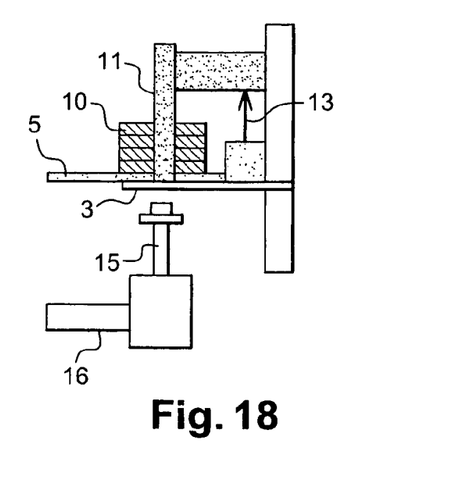
FIGS. 18 to 22 are schematic side views showing the operation of the device according to the invention as a tool is being mounted, the device having the system of FIG. 17.

In FIG. 18, the robotic arm 16 of a robot bearing a pin 15 for mounting and rotating a tool 10 is brought under the fixed support 3 such that the pin 15 is oriented vertically upward and aligned with the axis of the rod 11 for centering the tools 10.

When the micro-ram is supplied, this causes the piston rod 43 to emerge radially, locking the penultimate tool of the stack on the rod 11.

Figure 19:
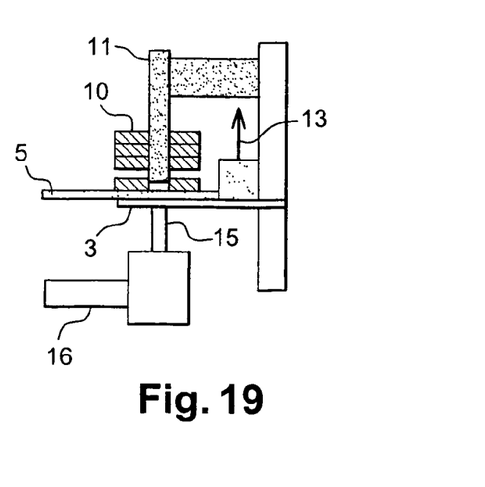

In the next step, shown in FIG. 19, the robotic arm 16 has moved vertically upward so that the top end of the pin 15 is engaged between the horizontal arms of the supports 3 and 5 and is inside the axial orifice of the lowermost tool 10 of the stack. In this position, the centering rod 11 of the device according to the invention has been pushed back upward by the top end of the pin 15 and has raised the penultimate tool 10 of the stack to move it axially away from the last tool 10 mounted on the pin 15.

Figure 20:
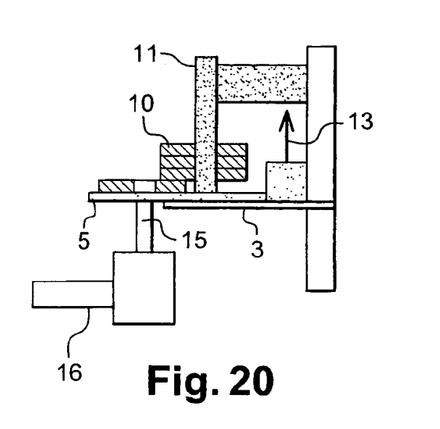
Figure 21:
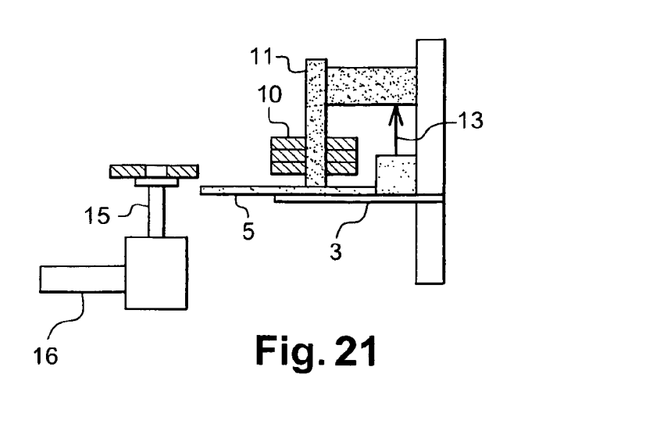
Figure 22:
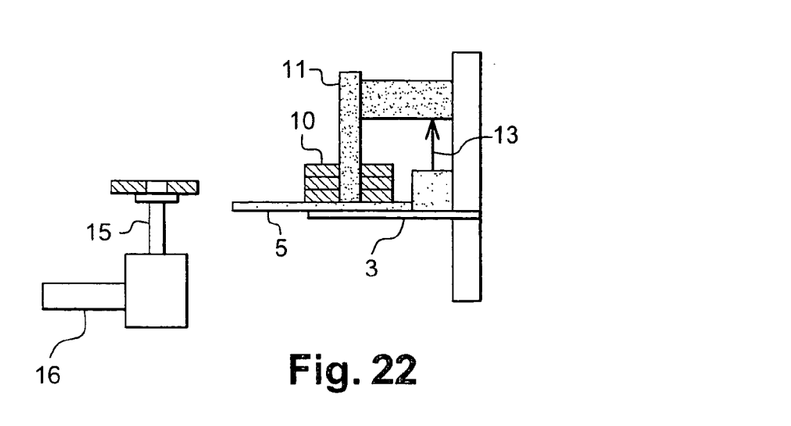

As shown in FIG. 20, the next step consists in moving the robotic arm 16 horizontally in a direction parallel to the support arms 3 and 5 to remove from the stack the lowermost tool 10 mounted on the pin 15. As this tool 10 is removed, it does not rub against the penultimate tool in the stack, which is held away from it by the rod 11 and the micro-ram 40. Next, the rod 11 comes back down, as shown in FIG. 21, the pressure on the micro-ram 40 is released, freeing the stack of tools, which comes back down onto the support 5, as shown in FIG. 22.

In a variant embodiment (not shown), the centering rod 11 is mounted so as to pivot on the horizontal arm 12 about a horizontal axis perpendicular to the rod 11 and the arm 12, so that it can be pivoted about this axis as the lowermost tool 10 is being removed from the stack, when this removal exerts on the rod 11 a force greater than a predetermined value (for example set by means of a shear pin). It is thus possible to prevent the rod 11 from being pulled off accidentally. Means such as a sensor are provided so that the pivoting of the rod 11 triggers an alarm to alert an operator.

The invention claimed is:

1. A device for automatically mounting and dismantling tools on a robot, comprising means for storing a number of identical tools and means for centering a tool in a position for automatic mounting on the robot, each tool comprising an axial orifice for mounting on a rotating pin provided on the robot, wherein the storage means comprise a surface for supporting a stack of tools and means for centering the stack of tools, consisting of an axially movable cylindrical rod engaged in the axial orifices of the tools of the stack, said support surface comprising an orifice through which said pin passes, located on the axis of the stack of tools and connected by a slot to an edge of the support surface, such that the pin can be engaged in the orifice of the support surface and in the axial orifice of the lowermost tool of the stack by pushing back the cylindrical centering rod, and then moved transversely in said slot to remove this tool from the storage means.

2. The device as claimed in claim 1, wherein the centering rod is guided in its axial movement with respect to the support surface for the tools, its movement toward said support surface being limited by stop means.

3. The device as claimed in claim 2, wherein the stop means comprise a spacer or wedge placed between an arm bearing the centering rod and the support surface for tools.

4. Device as claimed in claim 1, wherein the support surface for tools is mounted so as to slide in the tool stacking direction and cooperates with means that limit its movement in the direction away from the stack of tools.

5. The device as claimed in claim 4, wherein the storage means comprise a second support surface parallel to the first support surface and located under it, delimiting with it a housing for storing a partially worn tool, this second support surface comprising an axial orifice through which the pin passes, connected by a slot to an edge of this second support surface, the axial orifices and the slots of the two support surfaces being substantially identical and aligned.

6. The device as claimed in claim 5, which comprises a sensor for detecting the movement of the first surface with respect to the second surface for supporting tools.

7. The device as claimed in claim 1, wherein the tools are brushes or grinding wheels.

8. The device as claimed in claim 1, wherein the lower end of the centering rod comprises means for centering on the end of said pin.

9. The device as claimed in claim 1, wherein the centering rod comprises a radial finger designed to engage between the two lowermost tools of the stack and moved by a means such as a pneumatic ram.

10. The device as claimed in claim 1, wherein the centering rod is mounted so as to pivot on the horizontal arm about a horizontal axis perpendicular to the rod and the arm.

11. A method of automatically mounting and dismantling tools on a robot by implementing the device as claimed in one of the preceding claims, which method consists in:
   a) bringing the pin of the robot into a predetermined position on the axis of the stack of tools;
   b) moving the pin along the axis to engage it in the axial orifice of the lowermost tool of the stack, by pushing back the centering rod; and
   c) moving the pin in the direction away from the stack of tools to disengage the tool from the storage means.

12. The method as claimed in claim 11, which, to deposit a partially worn tool mounted on the pin, consists in:
   d) bringing this tool under the first support surface; and
   e) pushing the first support surface for tools using the tool mounted on the pin to move it away from the second support surface for tools; and
   f) moving the pin in a direction parallel to the support surfaces, to bring the tool between these support surfaces; and
   g) axially moving the pin, in the direction away from the stack of tools, to remove the partially worn tool and leave this tool between the two support surfaces.

13. The method as claimed in claim 12, which, to retrieve a partially worn tool, consists in:
   h) bringing the pin of the robot into a certain position under the two surfaces for supporting tools;
   i) moving the pin in the axis, to engage it on the partially worn tool; and
   j) moving the pin in a direction parallel to the support surfaces to disengage the tool from said support surfaces.

14. The method as claimed in claim 11, which, to check for the presence of a tool on the pin, consists in moving the first surface for supporting tools using the tool mounted on the pin of the robot and detecting this movement by means of a sensor.

15. The method as claimed in claim 11, which consists in determining beforehand six positions of the pin with respect to the storage means, comprising three high positions at the same level and three low positions at the same level, distributed over a rectangular path and aligned vertically in pairs, and in moving the pin by making it pass through these positions in order to mount a tool on the pin, check for the presence of the tool on the pin, and deposit and retrieve a partially worn tool between the surfaces for supporting tools.

* * * * *